(12) United States Patent
Sweeney et al.

(10) Patent No.: US 10,867,143 B2
(45) Date of Patent: Dec. 15, 2020

(54) SYSTEMS AND METHODS FOR AGE-RESTRICTED PRODUCT REGISTRATION

(71) Applicant: Integrated Solutions International, Inc., Winston-Salem, NC (US)

(72) Inventors: Michael F. Sweeney, Winston-Salem, NC (US); Thomas J. Stopyra, Winston-Salem, NC (US)

(73) Assignee: Integrated Solutions International, LLC, Winston-Salem, NC (US)

( * ) Notice: Subject to any disclaimer, the term of this patent is extended or adjusted under 35 U.S.C. 154(b) by 0 days.

(21) Appl. No.: 16/205,809

(22) Filed: Nov. 30, 2018

(65) Prior Publication Data

US 2019/0095665 A1   Mar. 28, 2019

Related U.S. Application Data

(63) Continuation-in-part of application No. 15/954,909, filed on Apr. 17, 2018, now Pat. No. 10,339,351, (Continued)

(51) Int. Cl.
*G06K 5/00* (2006.01)
*G06K 7/10* (2006.01)
(Continued)

(52) U.S. Cl.
CPC ....... *G06K 7/10821* (2013.01); *G06K 7/1404* (2013.01); *G06K 7/1408* (2013.01); *G06K 7/1417* (2013.01); *G06K 19/06037* (2013.01)

(58) Field of Classification Search
CPC ......... G06K 19/06037; G06K 7/10821; G06K 7/1404; G06K 7/1408; G06K 7/1417
See application file for complete search history.

(56) References Cited

U.S. PATENT DOCUMENTS 7,734,779 B1 * 6/2010 Piccionelli ............ H04L 63/083
                                                    709/217
8,392,975 B1   3/2013 Raghunath
(Continued)

FOREIGN PATENT DOCUMENTS

DE          10334012      2/2005
EP           1811472      7/2007
(Continued)

OTHER PUBLICATIONS

U.S. Appl. No. 16/418,285, "Non-Final Office Action", dated Nov. 25, 2019, 20 pages.
(Continued)

*Primary Examiner* — Thien M Le
(74) *Attorney, Agent, or Firm* — Kilpatrick Townsend & Stockton LLP

(57) ABSTRACT

Systems and methods for age-restricted product registration are disclosed. According to one disclosed embodiment, a system includes: a scanner configured to scan a passive data source on an identification card; and a processor coupled to the scanner, the processor configured to: receive a scanner signal from the scanner; verify an age of a user based on the scanner signal; and transmit a verification signal to an age-restricted device.

39 Claims, 6 Drawing Sheets

Related U.S. Application Data which is a continuation of application No. 15/382,319, filed on Dec. 16, 2016, now Pat. No. 9,984,266, which is a continuation of application No. 14/487,952, filed on Sep. 16, 2014, now Pat. No. 9,558,387.

(60) Provisional application No. 61/878,823, filed on Sep. 17, 2013, provisional application No. 62/746,675, filed on Oct. 17, 2018.

(51) Int. Cl.
*G06K 7/14* (2006.01)
*G06K 19/06* (2006.01)

(56) References Cited

U.S. PATENT DOCUMENTS

| | | | |
|---|---|---|---|
| 8,485,440 B1 | 7/2013 | Arora et al. | |
| 8,967,460 B1 | 3/2015 | Baykal et al. | |
| 9,558,387 B2 | 1/2017 | Sweeney et al. | |
| 9,721,147 B1* | 8/2017 | Kapczynski | G06Q 50/265 |
| 9,734,377 B2 | 8/2017 | Sevier et al. | |
| 9,984,266 B2 | 5/2018 | Sweeney et al. | |
| 10,339,351 B2 | 7/2019 | Sweeney et al. | |
| 2003/0037075 A1 | 2/2003 | Hannigan et al. | |
| 2003/0132292 A1* | 7/2003 | Gomez | G06Q 20/00 235/383 |
| 2004/0181749 A1 | 9/2004 | Chellapilla et al. | |
| 2005/0059339 A1 | 3/2005 | Honda et al. | |
| 2005/0080649 A1 | 4/2005 | Alvarez et al. | |
| 2006/0157559 A1 | 7/2006 | Levy et al. | |
| 2006/0256388 A1 | 11/2006 | Erol et al. | |
| 2006/0280364 A1 | 12/2006 | Ma et al. | |
| 2007/0005173 A1 | 1/2007 | Kanitz et al. | |
| 2007/0047818 A1 | 3/2007 | Hull et al. | |
| 2008/0191035 A1 | 8/2008 | Cheon | |
| 2008/0207296 A1* | 8/2008 | Lutnick | G07F 17/32 463/16 |
| 2008/0247363 A1 | 10/2008 | Lee et al. | |
| 2009/0001173 A1 | 1/2009 | Sevier et al. | |
| 2009/0039146 A1 | 2/2009 | Seo | |
| 2009/0108057 A1 | 4/2009 | Mu et al. | |
| 2009/0307232 A1 | 12/2009 | Hall | |
| 2012/0166309 A1 | 6/2012 | Hwang et al. | |
| 2013/0018794 A1 | 1/2013 | Ungerland, II et al. | |
| 2013/0112746 A1 | 5/2013 | Krell et al. | |
| 2014/0039932 A1 | 2/2014 | Walton, III | |
| 2014/0136012 A1 | 5/2014 | Tam | |
| 2014/0136223 A1 | 5/2014 | Phillips | |
| 2014/0222948 A1 | 8/2014 | Terasawa | |
| 2014/0279540 A1* | 9/2014 | Jackson | G06Q 20/381 705/44 |
| 2014/0289107 A1 | 9/2014 | Moshal | |
| 2015/0076225 A1 | 3/2015 | Sweeney et al. | |
| 2015/0081460 A1 | 3/2015 | Chong et al. | |
| 2015/0106291 A1* | 4/2015 | Robinson | G06F 21/62 705/339 |
| 2015/0120529 A1 | 4/2015 | Faaborg | |
| 2015/0124791 A1 | 5/2015 | Mazandarany et al. | |
| 2016/0098581 A1 | 4/2016 | Martí Ascencio et al. | |
| 2016/0100111 A1 | 4/2016 | Atkinson | |
| 2017/0098108 A1 | 4/2017 | Sweeney et al. | |
| 2017/0116450 A1 | 4/2017 | Sevier et al. | |
| 2017/0295014 A1 | 10/2017 | Baras et al. | |
| 2018/0068105 A1* | 3/2018 | Shapiro | H04L 63/083 |
| 2018/0197263 A1* | 7/2018 | Pearson | G06Q 10/00 |
| 2019/0050921 A1* | 2/2019 | Ryner | G06K 9/22 |
| 2019/0295353 A1* | 9/2019 | Cipriano | G06K 7/089 |

FOREIGN PATENT DOCUMENTS

| | | |
|---|---|---|
| EP | 3047423 | 7/2016 |
| WO | 2010031110 | 3/2010 |
| WO | 2011147433 | 12/2011 |
| WO | 2015042060 | 3/2015 |

OTHER PUBLICATIONS

U.S. Appl. No. 16/418,285, "Notice of Allowance", dated Mar. 26, 2020, 9 pages.
CA2,924,503, "Office Action", dated Dec. 28, 2016, 2 pages.
CA2,924,503, "Office Action", dated Nov. 24, 2017, 3 pages.
EP14777999.5, "Office Action", dated Jul. 13, 2017, 5 pages.
PCT/US2014/55916, "International Search Report and Written Opinion", dated Dec. 3, 2014, 12 pages.

* cited by examiner

SYSTEMS AND METHODS FOR AGE-RESTRICTED PRODUCT REGISTRATION

CROSS-REFERENCE TO RELATED APPLICATIONS

This application claims the benefit of Application No. 62/746,675, filed on Oct. 17, 2018, and entitled "Systems and Methods for Age-Restricted Product Registration," the entirety of which is hereby incorporated herein by reference. This application also claims the benefit of, and is a continuation-in-part of, U.S. patent application Ser. No. 15/954,909, filed on Apr. 17, 2018, and entitled "Systems and Methods For Decoding And Using Data On Cards," which is a continuation of and claims the benefit of U.S. patent application Ser. No. 15/382,319, filed on Dec. 16, 2016, and entitled "Systems and Methods For Decoding And Using Data On Cards," now U.S. Pat. No. 9,984,266, issued on May 29, 2018, which is a continuation of and claims the benefit of U.S. patent application Ser. No. 14/487,952, filed on Sep. 16, 2014, and entitled "Systems and Methods for Decoding and Using Data on Cards," now U.S. Pat. No. 9,558,387, issued on Jan. 31, 2017, which claims priority to U.S. Provisional Application No. 61/878,823, filed on Sep. 17, 2013, and entitled "Systems and Methods for Decoding and Using Data on Cards," the entirety of all of which is hereby incorporated by reference herein.

BACKGROUND

Electronic devices that dispense age-restricted material are available. These electronic devices do not include systems for restricting access to users who are too young to consume the age-restricted material. Identification cards, such as government issued identification cards, increasingly include some form of machine-readable data. Often many different entities (e.g., corporations, states, or government organizations) use different encoding for this machine-readable data.

SUMMARY OF EXAMPLE EMBODIMENTS

Embodiments of the present disclosure include devices comprising input devices for scanning passive data-sources, and processing ability to decode machine-readable data stored in the passive data-source. This information is then used to verify the age of a user. Once the user's age has been verified an activation signal is sent to an electronic device that dispenses age-restricted material (e.g., an e-cigarette or "vape" device).

One illustrative system according to the present disclosure comprises a system for activating an age-restricted device, the system comprising: a scanner configured to scan a passive data source on an identification card; and a processor coupled to the scanner, the processor configured to: receive a scanner signal from the scanner; verify an age of a user based on the scanner signal; and transmit a verification signal to an age-restricted device.

According to another embodiment, an illustrative system of the present disclosure comprises a system for activating an age-restricted device, the system comprising: a processor configured to receive an age verification signal and activate the age-restricted device based on the age verification signal; and a network interface configured to receive a verification signal from a remote device, wherein the remote device comprises: a scanner configured to scan a passive data source on an identification card; and a processor coupled to the scanner, the processor configured to: receive a scanner signal from the scanner; verify an age of a user based on the scanner signal; and transmit the verification signal to the age-restricted device.

According to another embodiment, a method according to the present disclosure comprises: receiving a scanner signal from a scanner configured to scan a passive data source on an identification card; verifying an age of a user based on the scanner signal; and transmitting a verification signal to an age-restricted device.

According to yet another embodiment, a method according to the present disclosure comprises: receiving an age verification signal from a remote device, wherein the remote device comprises: a scanner configured to scan a passive data source on an identification card; and a processor coupled to the scanner, the processor configured to: receive a scanner signal from the scanner; verify an age of a user based on the scanner signal; transmit the verification signal to the age-restricted device; and activating the age-restricted device based on the age verification signal.

According to yet another embodiment of the present disclosure a non-transitory computer readable medium may comprise program code, which when executed by a processor is configured to cause the processor to: receive a scanner signal from a scanner configured to scan a passive data source on an identification card; verify an age of a user based on the scanner signal; and transmit a verification signal to an age-restricted device.

According to yet another embodiment of the present disclosure a non-transitory computer readable medium may comprise program code, which when executed by a processor is configured to cause the processor to: receive an age verification signal from a remote device, wherein the remote device comprises: a scanner configured to scan a passive data source on an identification card; and a processor coupled to the scanner, the processor configured to: receive a scanner signal from the scanner; verify an age of a user based on the scanner signal; transmit the verification signal to an age-restricted device; and activate the age-restricted device based on the age verification signal.

This illustrative embodiment is mentioned not to limit or define the limits of the present subject matter, but to provide an example to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative illustrative embodiments and to the accompanying drawings. Each example is provided by way of explanation and not as a limitation. It will be apparent to those skilled in the art that modifications and variations can be made. For instance, features illustrated or described as part of one embodiment may be used on another embodiment to yield a still further embodiment. Thus, it is intended that this disclosure include modifications and variations as come within the scope of the appended claims and their equivalents.

Illustrative Example of a Device for Age Restricted Product Registration

Figure 1:
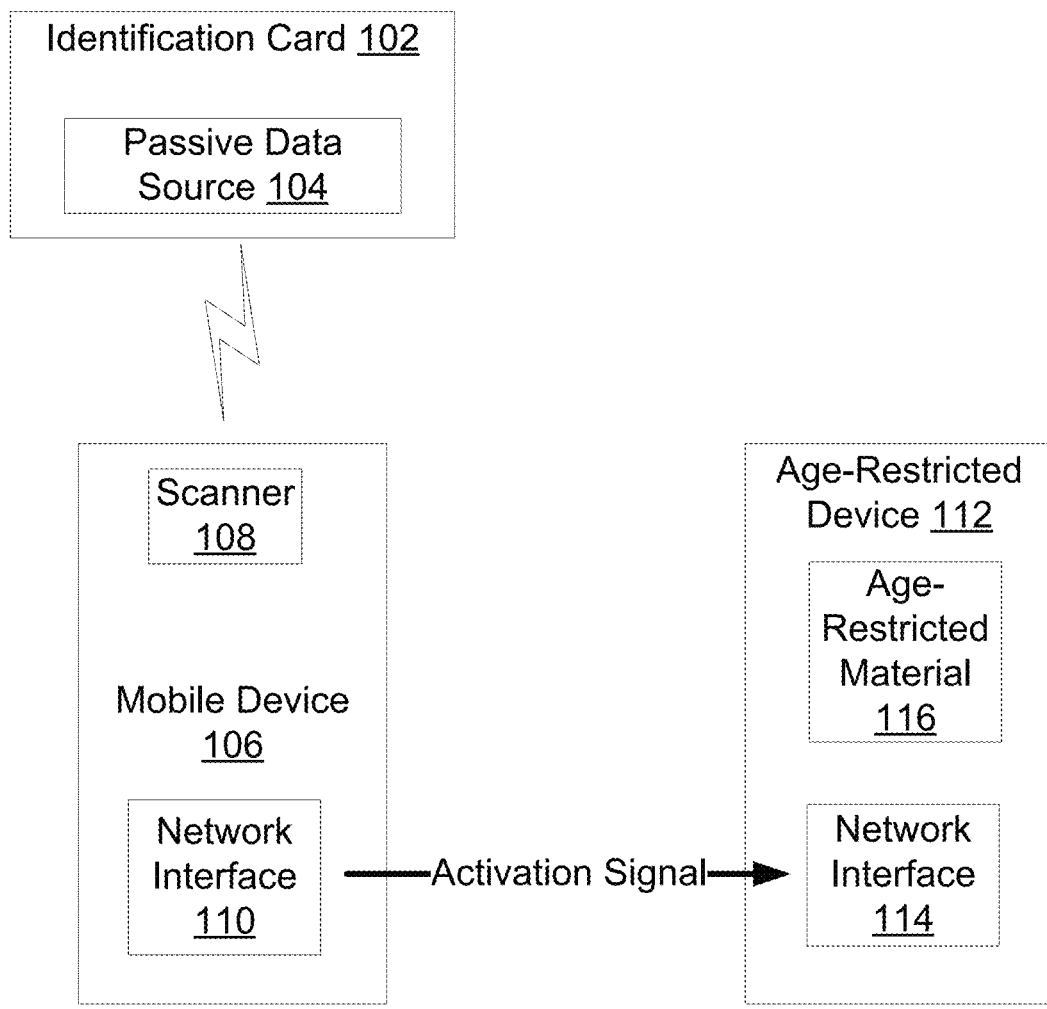
FIG. 1 shows an illustrative system for age-restricted product registration according to one embodiment of the present disclosure.

Turning now to FIG. 1, which shows one illustrative embodiment of the present disclosure 100. As shown in FIG. 1, the system 100 comprises an age-restricted device 112, such as an electronic cigarette (e-cigarette), which are sometimes referred to as vaping devices. An e-cigarette dispenses a vapor that contains nicotine, and which a user inhales. An e-cigarette is not authorized for use for people under the age of eighteen. An illustrative embodiment herein provides systems and methods for restricting the use of an e-cigarette by people under the age of eighteen.

The illustrative embodiment further comprises a mobile device 106 (e.g., a wearable device, smartphone, tablet, portable music device, or laptop). In the embodiment shown in FIG. 1, the mobile device 106 comprises a scanner 108 for reading data from an identification card 102 comprising a passive data source 104. In some embodiments, the identification card may include, e.g., a State Issued Driver License, State Issued Real ID Compliant Driver License, State issued identification card, Federally issued Passport or Military Identification. In some embodiments, the identification card 102 may comprise an electronic identification card, e.g., an electronic ID stored in an application on, e.g., the user's mobile device.

In the embodiment shown in FIG. 1, the scanner 108 comprises a digital camera configured to capture images. In the illustrative embodiment, this camera comprises a standard camera found on mobile devices, without any specialized hardware. The illustrative embodiment further comprises a network connection, such as a wired or wireless internet connection. The illustrative embodiment further comprises a network interface 110 (e.g., Bluetooth, Near Field Communication ("NFC"), or RFID) to connect to a similar network interface 114 on the age-restricted device 112.

In the illustrative embodiment the user accesses an application configured to verify the user's age by capturing an image of the user's identification card 102. For example, the user captures an image of either the front or back face of a driver's license. For example, the user may load a mobile application that includes a widget to execute an age-verification application. In such an embodiment, this widget may appear as a button, switch, graphical user interface, or other user interface available for use with the mobile application. After the user accesses this functionality, e.g., by interacting with the widget, the mobile device 106 may be configured to enter an image capture mode.

Figure 4A:
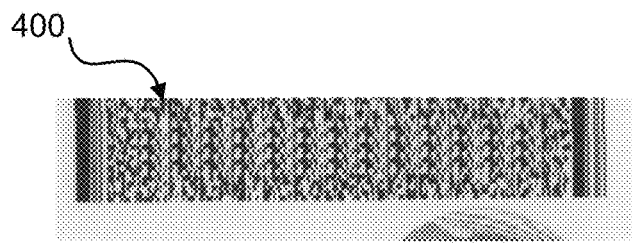
FIG. 4A shows yet another illustrative system for age-restricted product registration according to one embodiment of the present disclosure.
Figure 4B:
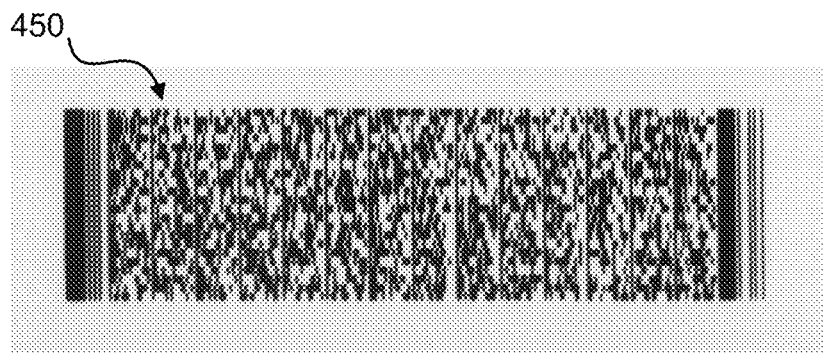
FIG. 4B shows yet another illustrative system for age-restricted product registration according to one embodiment of the present disclosure.

In the image-capture mode, the mobile device 106 may access a digital camera coupled to the mobile device and display the output on a display of the mobile device 106. The user may then direct the camera toward the user's identification card 102 (such as a driver's license). Specifically, the user may direct the camera toward passive data source 104, which may comprise machine-readable data (e.g., a barcode encoded in PDF-417 appearing on the back of the identification card). Examples of PDF-417 are shown in FIGS. 4A and 4B below. When the camera captures an image of the machine-readable data at sufficient resolution to extract the data encoded therein, the application may exit the image capture screen, and return to another screen of the mobile application.

Once the image has been captured, a processor on the mobile device 106 may process the image to extract encoded data. In some embodiments, this processing may comprise cropping and compressing the data contained on the image. The mobile device 106 may then use a network interface (e.g., a wired or wireless network interface) to transmit the image data to a server.

In some embodiments, the server may comprise algorithms developed to quickly process and determine information associated with the cards. In some embodiments, these algorithms may have been developed utilizing a database of data associated with identification cards. Currently, in the United States, there are more than 1,000 different formats of encoded data associated with identification cards issued by various entities (e.g., corporations, states, government organizations, military, or post office). For example, some states change the encoding used on their drivers licenses every few years. However, those states may leave the older drivers licenses in rotation. Thus, these identification cards may comprise out of date encoding. Further, some states may use multiple different types of encryption. Similarly, multiple states use different encoding and encryption, thus, an algorithm associated with, e.g., Georgia may not be useful for decoding data associated with another state's identification cards. In some embodiments, the remote database may comprise data associated with a large number of these entities. Algorithms developed based on the data in this database may enable the server to quickly process and parse the data on an identification card. Further, in some other embodiments, data comparison software or string searches may enable the database to be quickly searched to determine information about the received data.

Further, in some embodiments, the server may track whether the user has recently activated a different age-restricted device or bought more than a certain number of age-restricted devices. The server may be configured to deny access to a user that has activated another age-restricted device within a certain time period (e.g., one day or one-week), thus ensuring that one user who is of age (e.g., over eighteen or twenty-one) cannot activate multiple age-restricted devices for users that are not of age. In still other embodiments, the server may be configured to compare information associated with the user to a no sell list. If the user is on the no sell list the server may send information to the mobile device 106 to prevent the mobile device 106 from activating the age-restricted device 112.

Once the data is decoded, the server may use a network connection to transmit the decoded data back to the mobile device 106. Once the mobile device receives this data, it will confirm that the user is over an age required to access the age-restricted device. If the user is over the age required to access the age-restricted device, the computing device will transmit an activation signal to the age-restricted device 112. Once the age-restricted device receives this activation signal, it will be activated and allow users to access the age-restricted material 116. In some embodiments, the age-restricted material 116 may comprise one or more of e.g., a nicotine or a cannabinoid such as THC or CBD containing substance, or some controlled medication (e.g., anxiety or depression medication), opioids, or some other controlled substance, which may be configured to be vaporized or otherwise dispensed by age-restricted device 112.

This illustrative embodiment is mentioned not to limit or define the limits of the present subject matter, but to provide an example to aid understanding thereof. Illustrative embodiments are discussed in the Detailed Description, and further description is provided there. Advantages offered by various embodiments may be further understood by examining this specification and/or by practicing one or more embodiments of the claimed subject matter.

Illustrative Systems for Age-Restricted Product Registration

Figure 2A:
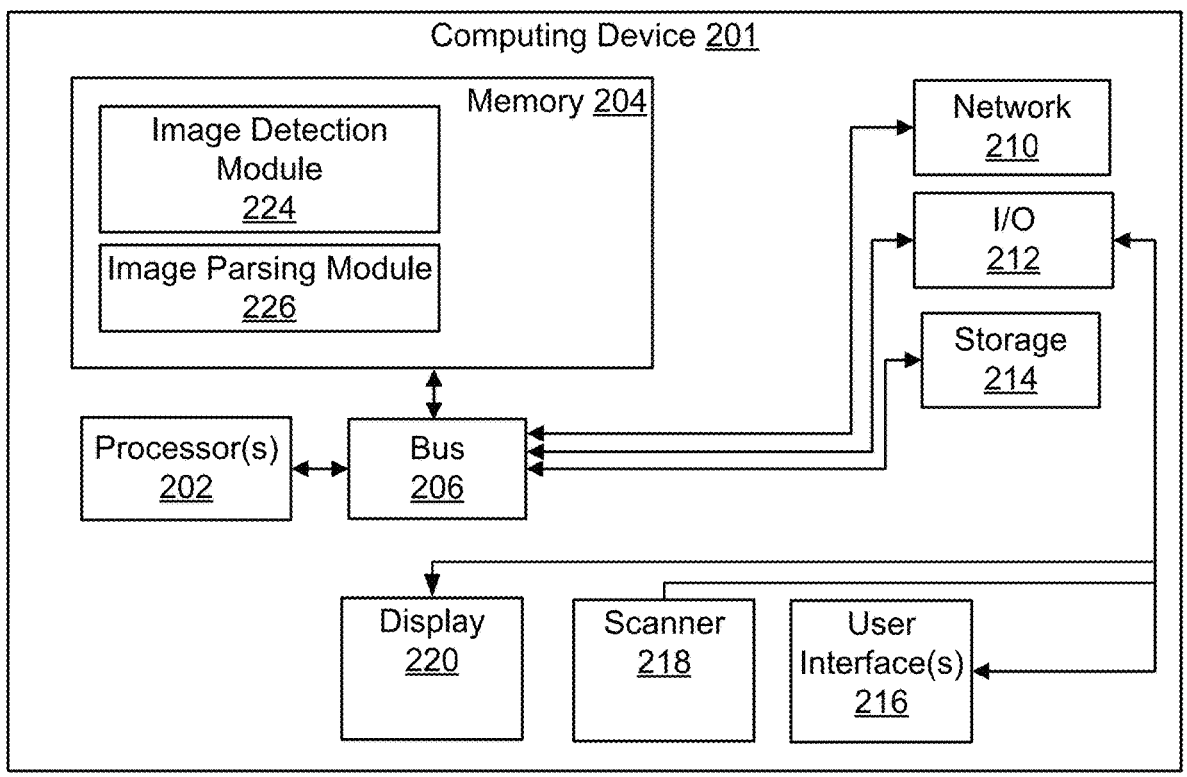
FIG. 2A shows another illustrative system for age-restricted product registration according to one embodiment of the present disclosure.

FIG. 2A shows an illustrative system 200 for age-restricted product registration. Particularly, in this example, system 200 comprises a computing device 201 such as, e.g., a wearable device, smartphone, tablet, portable music device, laptop, desktop, kiosk, or dedicated computer terminal. As shown in FIG. 2A, computing device 201 has one or more processor(s) 202 interfaced with other hardware via bus 206. A memory 204, which can comprise any suitable tangible (and non-transitory) computer-readable medium such as RAM, ROM, EEPROM, or the like, embodies program components that configure operation of the computing device. In this example, computing device 201 further includes one or more network interface devices 210, input/output (I/O) interface components 212, and additional storage 214.

Network device 210 can represent one or more of any components that facilitate a network connection. Examples include, but are not limited to, wired interfaces such as Ethernet, USB, IEEE 1394, and/or wireless interfaces such as IEEE 802.11, Bluetooth, Near Field Communication, RFID, and/or radio interfaces for accessing cellular telephone networks (e.g., transceiver/antenna for accessing a CDMA, GSM, UMTS, or other mobile communications network(s)).

I/O components 212 may be used to facilitate connection to devices such as one or more user interfaces 216 (e.g., keyboards, mice, speakers, microphones, and/or other hardware used to input data or output data) and display 220 (e.g., a display such as a plasma, liquid crystal display (LCD), electronic paper, cathode ray tube (CRT), light emitting diode (LED), or some other type of display known in the art). In some embodiments, user interfaces 216 and display 220 may comprise a single component, e.g., a touch screen display. In some embodiments, I/O components 212 may include speakers configured to play audio signals provided by processor 202. Storage 214 represents nonvolatile storage such as magnetic, optical, or other storage media.

Scanner 218 comprises a sensor configured to detect a passive data-source, such as data encoded in a multidimensional code. For example, in one embodiment, scanner 218 may comprise an optical sensor such as a digital camera. In such an embodiment, processor 202 may use scanner 218 to take an image of a passive data-source, e.g., a matrix barcode such as a QR code, bar code, or multidimensional bar code encoded in PDF-417. In some embodiments, the digital camera may comprise no specialized hardware capability, for example, in some embodiments, the digital camera may be a standard digital camera found on mobile devices such as smartphones and tablets. Further, in some embodiments, the digital camera may comprise an auto-focus capability that enables the camera to capture an image of the multidimensional code at sufficient resolution to reliably extract the encoded data. In such an embodiment, processor 202 may use software stored in memory 204 (discussed below) to determine data encoded in the multidimensional bar code. In other embodiments, scanner 218 may comprise another component, such as a laser scanner, CCD, reader, video camera reader, or other type of scanner configured to scan a passive data-source such as a multidimensional bar code. In still other embodiments, scanner 218 may comprise a scanner configured to detect data from a magnetic code (e.g., a magnetic strip), an RFID, NFC, a SmartCard, an Integrated Circuit Card (ICC) or some other type of passive data.

Turning to memory 204, exemplary program components 224 and 226 are depicted to illustrate how a device may be configured to decode data on identification cards. In this example, an image detection module 224 configures processor 202 to monitor the input from scanner 218 to detect an image comprising machine-readable data. For example, module 224 may configure processor 202 to enter an image capture mode in which display 220 shows the output from scanner 218. Further, in some embodiments, image detection module 224 may be configured to determine the quality of data received from scanner 218. For example, in one embodiment, this may comprise measuring the resolution and focus of the received image. In some embodiments, image detection module 224 may further comprise software to enable processor 202 to determine that the image is of sufficient quality, and therefore capture the image.

Image-parsing module 226 represents a program component that analyzes image data received from scanner 218. In one embodiment, image-parsing module 226 may comprise software configured to enable processor 202 to crop and/or compress the captured image for transmission via network 210 to a remote server. In further embodiments, image-parsing module 226 may comprise program components configured to enable processor 202 to perform an image comparison between the captured image and data stored on a local database. In some other embodiments, image-parsing module 226 may comprise algorithms that enable the processor 202 to quickly determine the data encoded in a label, e.g., the name, date of birth, address, driver's license number, height, weight, state, county, race, organ donor status, issue date, expiration date, driver restriction, class of vehicle, passport information, criminal record information, or any other information stored in the encoded data. In some embodiments, some of this information may be withheld, e.g., due to privacy concerns. Thus, in some embodiments, information such as a person's height, weight, race, organ donor status, driver restrictions, or class of vehicle may be withheld.

In other embodiments, program components 224 and 226 may be comprise software components configured to enable processor 202 to process other types of passive data-sources, e.g., magnetic strips, RFIDs, NFC, SmartCards, or Integrated Circuit Cards (ICC).

In other embodiments, computing device 201 may comprise additional components, such as motion detectors, accelerometers, or GPS receivers that processor 202 may use to determine other information, such as the movements or orientation of computing device 201.

Figure 2B:
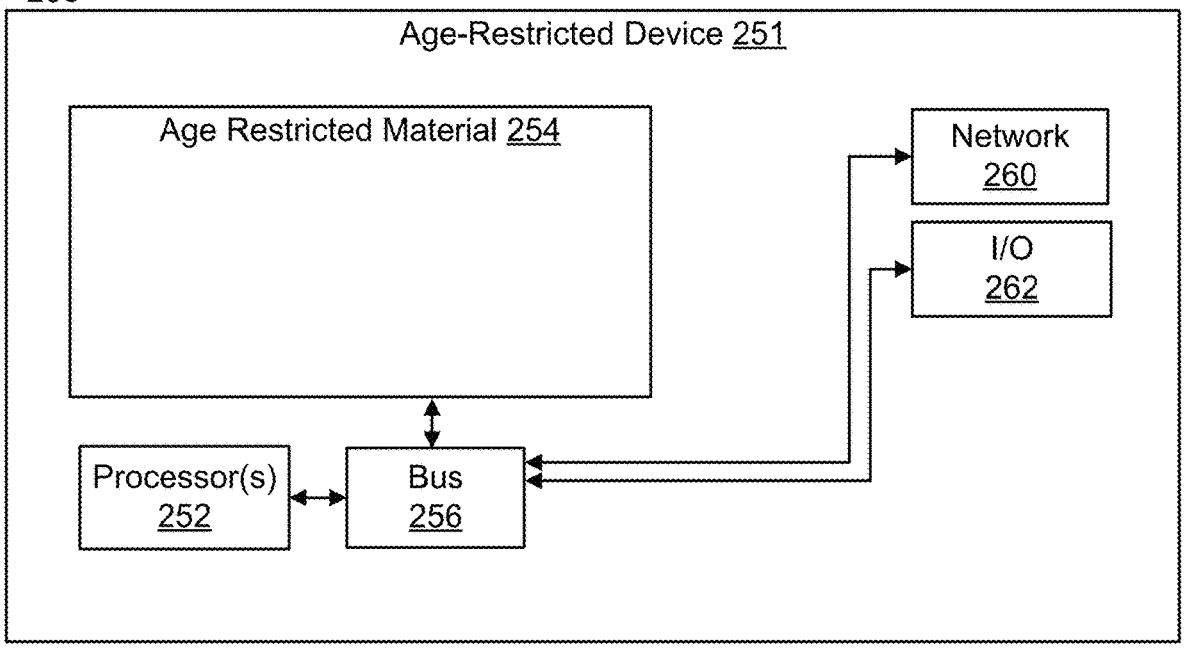
FIG. 2B shows another illustrative system for age-restricted product registration according to one embodiment of the present disclosure.

Turning now to FIG. 2B, which shows an illustrative system 250 for age-restricted product registration. Particularly, in this example, system 250 comprises an age-restricted device 251, e.g., an e-cigarette device. As shown in FIG. 2B, the system 250 has one or more processor(s) 252 interfaced with other hardware via bus 256, age-restricted material 254 (e.g., a nicotine or a cannabinoid such as THC or CBD containing substance, or some controlled medication (e.g., anxiety or depression medication), opioids, or some other controlled substance, which may be configured to be vaporized or otherwise dispensed by age-restricted device 251), a network interface 260, and input/output (I/O) interface components 262.

Network device 260 can represent one or more of any components that facilitate a network connection. Examples include, but are not limited to, wired interfaces such as Ethernet, USB, microUSB, Firewire, IEEE 1394, and/or wireless interfaces such as IEEE 802.11, Bluetooth, Near Field Communication, RFID, and/or radio interfaces for accessing cellular telephone networks (e.g., transceiver/antenna for accessing a CDMA, GSM, UMTS, or other mobile communications network(s)). In some embodiments, network interface 260 is configured to receive an activation signal from computing device 201, described above with regard to FIG. 2A, transmit this activation signal to processor(s) 252, which then activate the age-restricted device 251 based on the activation signal.

I/O components 262 may be used to facilitate connection to devices such as one or more user interfaces 266 (e.g., keyboards, mice, speakers, microphones, and/or other hardware used to input data or output data) and display 220 (e.g., a display such as a plasma, liquid crystal display (LCD), electronic paper, cathode ray tube (CRT), light emitting diode (LED), or some other type of display known in the art). In some embodiments, I/O components 262 may include speakers configured to play audio signals provided by processor 262.

Figure 3:
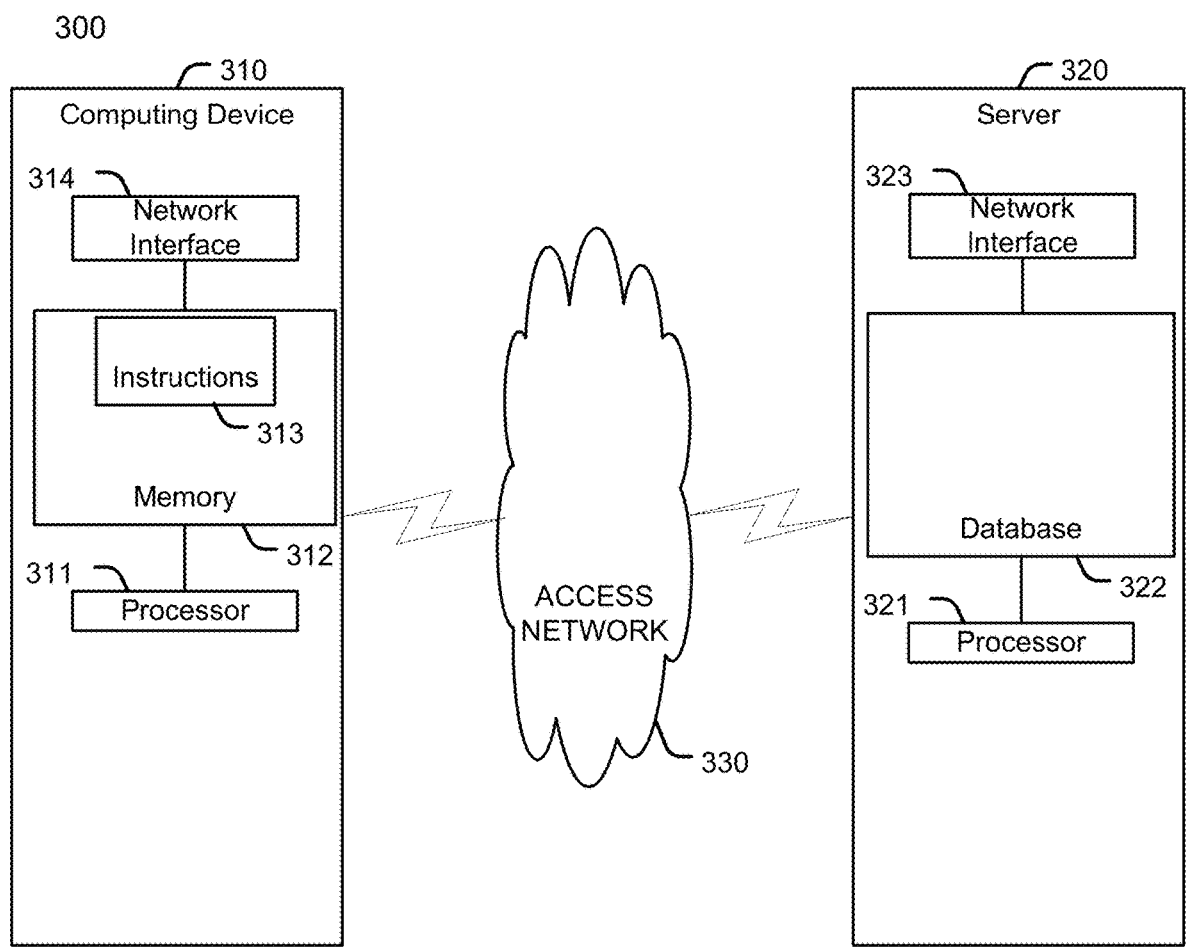
FIG. 3 shows another illustrative system for age-restricted product registration according to one embodiment of the present disclosure.

FIG. 3 illustrates another illustrative system for age-restricted product registration 300. As shown in FIG. 3, system 300 comprises a computing device 310, comprising a processor 311, memory 312 comprising instructions 313, and a network interface 314. In some embodiments, computing device 310, and its components may operate similarly to the components of computing device 201 described above with regard to FIG. 2A. Thus, in some embodiments, the components of computing device 310 may enable the computing device to scan a passive data-source, process the data, and transmit the processed data via access network 330.

In some embodiments the access network 330 may be a 3GPP network, a 3GPP2 network, a WiMAX network, 4G LTE, HSPA+, UMTS, a Wi-Fi network (e.g., a network that operates in accordance with an IEEE 802.11 standard), or some other wireless access network. In other embodiments, access network 330 may comprise a wired network such as Ethernet, USB, microUSB, Firewire, IEEE 1394, cable, or telephone networks. In some embodiments, access network 330 may comprise a plurality of different types of wired and/or wireless networks configured to transmit data between computing device 310 and server 320.

As shown in FIG. 3, the access network 330 is further coupled to a server 320. Server 320 is configured to receive data sent from computing device 310 via access network 330 using network interface 323. Network interface 323 may comprise a wired and/or wireless network interface configured to receive data using access network 330.

Server 320 further comprises a processor 321 coupled to a database 322. Database 322 may comprise a database of data associated with identification cards. In some embodiments, the database 322 may comprise data associated with identification cards issued by one or more of corporations, states, and government organizations. Processor 321 may be configured to use data comparison software to compare data received from computing device 310 to data stored in database 322 to determine the type of encoding associated with an image and then quickly decode the data, e.g., by parsing the data to determine the stored information, e.g., the name, date of birth, address, driver's license number, height, weight, state, county, or any other information stored in the encoded data.

In other embodiments, rather than performing a full lookup of database 322, processor 321 may instead comprise algorithms configured to determine information about a passive data source without having to search database 322. In some embodiments, these algorithms may have been developed using the data available in database 322. Further, in some embodiments, these algorithms may enable the processor 321 to quickly determine the jurisdiction that issued a card, e.g., by determining the Issuer Identification Number ("TIN Number") associated with the card, or the type of encryption used in the card. Once this is determined, processor 321 may access an algorithm associated with that IIN number to quickly determine data associated with the passive data source. In some embodiments, processor 321 may be configured to determine the stored data in 2 seconds or less.

Further, in some embodiments, processor 321 and database 322 may be configured to adapt to new data types. For example, in some embodiments, the administrators of database 322 may periodically update database 322 with new data associated with new entities (e.g., states, government organizations, or corporations). In other embodiments, processor 321, may be configured to update database 322 based on new data received from entities as the entities post new information (e.g., as a state releases a new type of identification card).

In other embodiments, processor 321 and database 322 may be configured to analyze received data that is not associated with a known type, and based on patterns of other received data, make a determination about the received data. For example, in one embodiment, processor 321 and database 322 may be configured to compare the encoding to known encoding types and thus determine that the encoded data is associated with North Carolina. The processor 321 and database 322 may be configured to further determine that some component of the encoding or encryption is incorrect, for example, because the person who set up the multidimensional code for the drivers' licenses in a jurisdiction (e.g., a state or county) used the wrong type of encoding. Based on this determination processor 321 may update database 322 with new information about this jurisdiction (e.g., the state or county), to thus enable processor 321 to use database 322 to determine data associated with that jurisdiction in the future. In still other embodiments, computing device 310 and server 320 may comprise additional components, such as additional memory and processing components or network components configured to provide faster or more convenient access via access network 330.

In some embodiments, the parsed data may be stored on the server 320. In some embodiments, this information may be used for future processing and authentication. For example, in some embodiments, a user may not be able to authenticate more than one device within a set time period (e.g., one-day, one-week, one-month) to prevent a user from authenticating multiple age-restricted devices and distributing them. Further, in some embodiments, the server 320 may store the total amount of an age-restricted substance purchased by the user. In some embodiments, this information may be used to restrict the user's access to additional amounts of an age restricted substance. For example, one user may not be able to purchase over a certain quantity of the age-restricted substance in a set time period. In still other embodiments, the user's age, the total amount of a substance the user has purchased, and the time since the user's last purchased may all be used together to determine whether the user can purchase more of the age-restricted substance. In still other embodiments, the server may be configured to determine whether the user is on a no sell list, and, if so, prevent the user from being able to activate the age-restricted device.

Further, in some embodiments, the user may be able to deactivate an age-restricted device, e.g., if the user loses the age-restricted device. In such an embodiment, users may verify their identity by scanning an ID card as described above and sending data to the server 320 indicating that an age-restricted device should be deactivated. In such an embodiment, the server 320 may send a signal to the age-restricted device or to a computing device associated with the age-restricted device to deactivate the age-restricted device so it cannot be operated.

Turning now to FIGS. 4A and 4B, FIGS. 4A and 4B comprise images 400 and 450 of data encoded on the back of drivers licenses from two different states. As shown in FIGS. 4A and 4B, the data is encoded using PDF-417. As discussed above, PDF-417 is a stacked linear barcode format. PDF stands for Portable Data File. The 417 signifies that each pattern in the code consists of 4 bars and spaces, and that each pattern is 17 units long.

In some embodiments, data encoded using PDF-417 may further comprise some type of compression or encryption. These types of encryption and compression are applied irregularly amongst jurisdictions such as Federal and State organizations. The present disclosure comprises a database that takes into account these differences and is usable for all jurisdictions (e.g., using a prior technology a Georgia government body may be able to scan identification cards issued by Georgia but cannot effectively scan cards issued by other states). Further, in some embodiments, additional data may be encoded into the identification card. For example, in Florida some information associated with the driver may be embedded into the driver's license number. Thus, in some embodiments, a database associated with Florida driver's licenses may be useful only if it is designed to store this information.

Figure 4C:
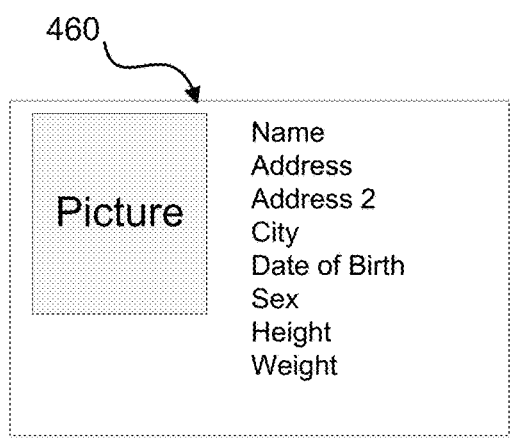
FIG. 4C shows yet another illustrative system for age-restricted product registration according to one embodiment of the present disclosure.
Figure 4D:
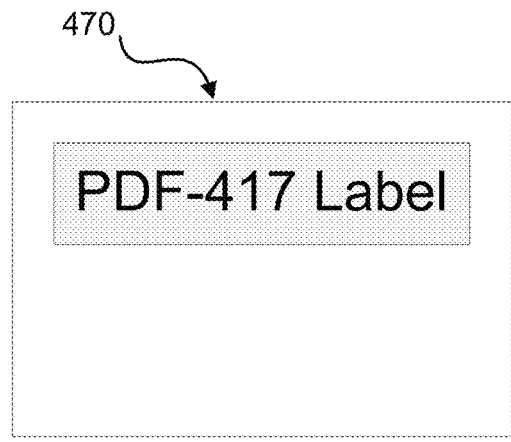
FIG. 4D shows yet another illustrative system for age-restricted product registration according to one embodiment of the present disclosure.

Turning to FIG. 4C, FIG. 4C illustrates an example embodiment of the front face of an identification card 460. As shown in FIG. 4C, the identification card is an example similar to many states' driver's licenses and includes a picture as well as written information identifying the holder of the driver's license. FIG. 4D shows the reverse side 470 of the identification card 460. As shown in FIG. 4D, the identification card includes a PDF-417 label (e.g., labels 400 or 450 described above). In some embodiments, this label may comprise all or some part of the data on the front of the identification card. Further, in some embodiments, rather than being on the back of the card, the label may instead be located on the front. For example, some military identification cards (e.g., CAC cards) include a label on the front of the card. Some of these cards further include additional passive data-sources, such as ICC, SmartCards, RFIDs, NFCs, magnetic strips, or QR Codes. In some embodiments, rather than a PDF-417 label, the driver's license may instead comprise one of these other types of passive data-sources. Embodiments of the present disclosure may use similar technology to capture and decode data stored in these additional types of passive data sources. Further, In some embodiments, the identification card may comprise an electronic identification card, e.g., an electronic ID stored in a computer associated with the user, e.g., stored in an application on the user's mobile device.

Illustrative Methods for Age-Restricted Product Registration

Figure 5:
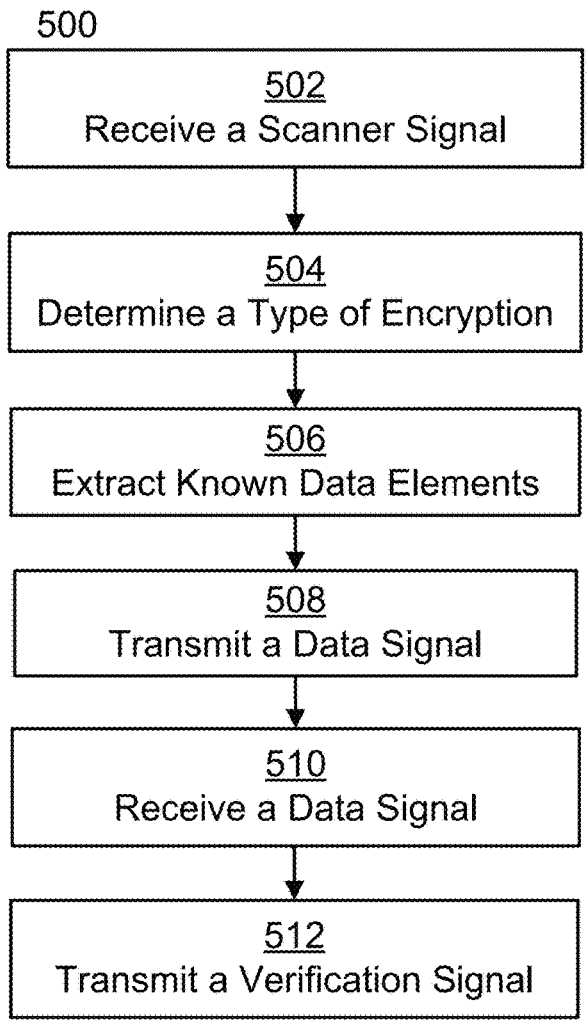
FIG. 5 shows a flow chart of method steps for implementing a method for age-restricted product registration according to one embodiment of the present disclosure.

FIG. 5 is a flowchart showing an illustrative method 500 for age-restricted product registration. In some embodiments, the steps in flow chart 500 may be implemented in program code executed by a processor, for example, the processor in a general purpose computer, mobile device, or server. In some embodiments, these steps may be implemented by a group of processors. In some embodiments the steps shown in FIG. 5 may be performed in a different order. Alternatively, in some embodiments, one or more of the steps shown in FIG. 5 may be skipped or additional steps not shown in FIG. 5 may be performed. The steps below are described with reference to components described above with regard to the systems described above with regard to FIGS. 2A, 2B, and 3.

The method 500 is described with regard to image capture of a passive data source (e.g., of an image of a multidimensional bar code). However, the steps below are equally applicable to processing data extracted from other types of passive data sources. For example, these method steps may be applied to capturing data from a magnetic code (e.g., a magnetic strip), an RFID, NFC, a SmartCard, an Integrated Circuit Card (ICC) or some other type of passive data. Further, in some embodiments, the methods described below may be used to extract data appearing as printed text on the front of an identification card. In such an embodiments the processor 202 may be configured to perform an optical character recognition (OCR) of this text.

The method 500 begins at step 502 when processor 202 receives a scanner signal from scanner 218. As discussed above, scanner 218 may comprise one of a plurality of devices configured extract data from a passive data source (e.g., a barcode or other information printed on an identification card). In one embodiment, scanner 218 may comprise a camera configured to capture an image of the front or the back of an identification card. In some embodiments, the image may comprise an image of machine-readable data encoded in an identification card (e.g., on the back of the identification card). In some embodiments, the machine-readable data may comprise a multidimensional encoding, such as data encoded using PDF-417. In other embodiments, the image may comprise an image of text printed on the front or the back of the identification card. In still other embodiments the scanner 218 may comprise a scanner configured to scan other types of passive data sources, e.g., a magnetic code (e.g., a magnetic strip), an RFID, NFC, a SmartCard, an Integrated Circuit Card (ICC) or some other type of passive data.

Next processor 202 determines a type of encryption associated with the scanner signal 504. In some embodiments, determining the type of encryption may comprise determining a type of encoding associated with the scanner signal or determining that the scanner signal is not encoded or encrypted. For example, in some embodiments, determining a type of encryption may comprise determining how data is encoded, e.g., encoded in a matrix barcode such as a QR code, bar code, or multidimensional bar code encoded in PDF-417. Further, in some embodiments, determining a type of encoding may comprise determining a type of scanner, e.g., determining that the scanner signal is received from one or more different types of scanners 218, e.g., scanners configured to detect information embedded in one or more of an image, a magnetic code (e.g., a magnetic strip), an RFID, NFC, a SmartCard, an Integrated Circuit Card (ICC) or some other type of passive data. In still other embodiments, the type of encryption may be determined by processor 321 on a server connected to computing device 201 via a network connection.

At step 506 the processor 202 extracts known data elements from the scanner signal. For example, the processor may be configured to extract data elements such as e.g., the name, date of birth, address, driver's license number, height, weight, state, county, race, organ donor status, issue date, expiration date, driver restriction, class of vehicle, passport information, criminal record information, or any other information stored based on the scanner signal. The processor 202 may extract this information by comparing the scanner signal to data stored in a local data store. Alternatively, the processor 202 may execute algorithms to extract certain encoded data from the scanner signal. In still other embodiments, known data elements may be determined by processor 321 on a server connected to computing device 201 via a network connection.

Then at step 508 processor 202 transmits data associated with the scanner signal to a server 320. In some embodiments, processor 202 may compress data prior to transmission, e.g., the processor 202 may perform one or more compression algorithms to reduce network overhead and upload time in transmitting data associated with the scanner signal. Processor 202 may use network 210 to transmit the data. As discussed above, network 210 may comprise any type of wired and/or wireless network available to computing device 201. In other embodiments, processing the image data may comprise extracting known elements from the image. For example, in some embodiments, the image may comprise non-encrypted PDF-417. In such an embodiment, processor 202 may extract available known data from the image. For example, in some embodiments, the processor 202 may resize the image to 640×480 pixels, transform the image to 24-bit grayscale with a quality of 80%, and convert the image to Base64 string representation.

Processor 321 on server 320 may process the scanner signal to extract data from the scanner signal. Alternatively, in some embodiments, the processing may occur on processor 202 local to computing device 201. In some embodiments, processing the scanner signal may comprise determining information about the scanner signal, e.g., a type of encoding or encryption type associated with the scanner signal. In some embodiments, processing the data may comprise comparing the data to a database. In other embodiments, rather than performing a line-by-line comparison to a database, the server may instead use a series of algorithms developed based on previous cards to determine the data. For example, the server may comprise a database 322 of data associated with identification cards. The server may further comprise a series of algorithms configured to determine information about identification cards.

In some embodiments, these algorithms may have been developed using the data stored in database 322. In some embodiments, these algorithms may enable the server to quickly determine identification data. For example, the server may use algorithms and logic to quickly determine the TIN Number associated with the card. Further, once the IIN number is identified, the server may use low overhead string functions to perform a lookup in a specially formatted string that contains all of the applicable values. In some embodiments, this may comprise using a Supertanker String Lookup technique during the data discovery process. These may comprise low overhead string functions to perform a lookup in a specially formatted string that contains all of the applicable values. For example, enclosing the ID Issue State/Province in dashes "-" and looking for the index of its position in the following string: "-BC-, -MB-, -NF-, -PO-, -SK-, -ON-, -NS-, -NB-, -PE-". In some embodiments, if the index is greater than zero, then the country of origin is Canada. Another example, putting a dash in front of the TIN and looking for the index of its position in a string like the following would return the corresponding state if valid: "-636033AL, -636059AK, -636026AZ, -636021AR". In both of the above examples, the resources required to find the position of a string within another are much lower than doing a lookup in a table or other data structure.

Further, in some embodiments, processing the image data comprises determining that there is enough captured data to start the process. In some embodiments, processing may also determine whether the data was extracted from a magnetic stripe (e.g., via swiping a reader rather than a captured image) or a barcode. In some embodiments, processing the data may further comprise replacing any invalid binary characters and standardizing on the Track Sentinels. In some embodiments, processing the data may further comprise checking binary data points to determine if any information is encrypted (e.g., if the data comprises an encrypted driver's license or identification card). In some embodiments, the processing may further comprise replacing any invalid binary characters and determining the type of data (e.g., driver's license, military identification, passport, or some other data type).

Processing the scanner signal enables data associated with the scanner signal to be determined. In some embodiments, determining the data associated with the scanner signal comprise parsing the data to determine the stored information, e.g., the name, date of birth, address, driver's license number, height, weight, state, county, issue date, expiration date, or any other information stored in the encoded data. In some embodiments, this parsing process may comprise identifying and consolidating the field separators and delimiters in the multidimensional code, and identifying the name parts, taking into account the variations based on state/province, and intelligently recognizing which parts of the name are provided.

In some embodiments, the parsed data may be stored on the server 320. In some embodiments, this information may be used for future processing and authentication. For example, in some embodiments, a user may not be able to authenticate more than one device within a set time period (e.g., one-day, one-week, one-month) to prevent a user from authenticating multiple age-restricted devices and distributing them. Further, in some embodiments, the server 320 may store the total amount of an age-restricted substance purchased by the user. In some embodiments, this information may be used to restrict the user's access to additional amounts of an age restricted substance. For example, one user may not be able to purchase over a certain quantity of the age-restricted substance in a set time period. In still other embodiments, the user's age, the total amount of a substance the user has purchased, and the time since the user's last purchased may all be used together to determine whether the user can purchase more of the age-restricted substance.

Then at step 508, server 320 transmits a data signal associated with the data extracted from the scanner signal. In some embodiments, this data signal comprises information associated with the age or identity of the user who scanned the identification card. Further, in some embodiments, this data includes whether the user is authorized to activate an age-restricted device 251, e.g., the user is over a certain age and had not activated an age-restricted device within a certain time period.

At step 510, the computing device 201 receives the data signal from the server 320. Then at step 512, the computing device 201 transmits an activation signal to the age-restricted device 251. The activation signal may be transmitted via either a wired or wireless network connection, e.g., via one or more of a Ethernet, USB, microUSB, Firewire, IEEE 1394, and/or wireless interfaces such as IEEE 802.11, Bluetooth, Near Field Communication, RFID, and/or radio interfaces for accessing cellular telephone networks (e.g., transceiver/antenna for accessing a CDMA, GSM, UMTS, or other mobile communications network(s)). The activation signal causes a processor 252 on the age-restricted device to activate the device and enable a user to access age-restricted material 254 on the device. For example, if the age-restricted device 251 is an e-cigarette, the activation signal will enable the user to use the e-cigarette. In some embodiments, the age-restricted device 251 is required to be activated only once. In other embodiments, the age-restricted device 251 must be activated each time a user attempts to use the device, or must be activated within a certain set period, e.g., every day, week, month, etc.

Figure 6:
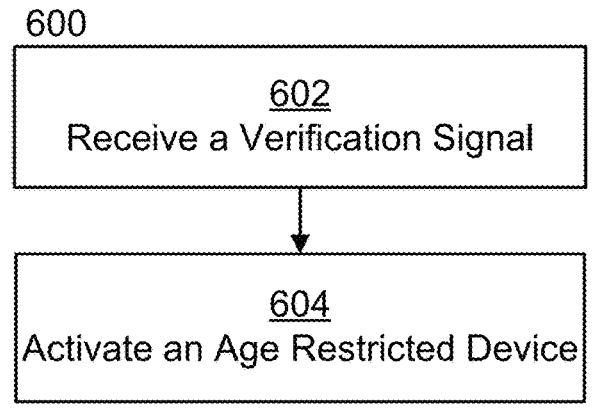
FIG. 6 shows a flow chart of method steps for implementing a method for age-restricted product registration according to one embodiment of the present disclosure.

Turning now to FIG. 6, which is a flowchart showing an illustrative method 600 for age-restricted product registration. In some embodiments, the steps in flow chart 600 may be implemented in program code executed by a processor, for example, the processor in a general purpose computer, mobile device, or server. In some embodiments, these steps may be implemented by a group of processors. In some embodiments the steps shown in FIG. 5 may be performed in a different order. Alternatively, in some embodiments, one or more of the steps may be skipped or additional steps may be performed. The steps below are described with reference to components described above with regard to the systems described above with regard to FIGS. 2A, 2B, and 3.

At step 602 an age-restricted device 251 receives a verification signal from computing device 201. The verification signal was determined based on scanning a passive data source and extracting data from the passive data source as described in the embodiments above.

At step 604 a processor 252 activates the age-restricted device based on the verification signal. In some embodiments, the activation signal causes a processor 252 on the age-restricted device to activate the device and enable a user to access age-restricted material 254 on the device. For example, if the age-restricted device 251 is an e-cigarette, the activation signal will enable the user to use the e-cigarette. In some embodiments, the age-restricted device 251 is required to be activated only once. In other embodiments, the age-restricted device 251 must be activated each time a user attempts to use the device, or must be activated within a certain set period, e.g., every day, week, month, etc.

In some embodiments, the systems and methods described above may be provided to application developers on a software development kit (SDK) that enables the developer (e.g., the developer of the webpage or iOS, Android, or Windows application) to quickly plug the functionality into their application or web page as a module. In other embodiments, an application or web page development company may develop its own image capture software, but may be given access to image processing capability using the database and algorithms described herein. In other embodiments, the database of data associated with identification card data may be sold to application or web page development companies. In other embodiments, only portions of the database may be sold or made available, e.g., only the segment of the database associated with a state, region, or government entity. In other embodiments, algorithms developed to determine identification data associated only a certain region may be made available.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed is:

1. A system for activating an age-restricted device, the system comprising:
   a scanner configured to scan a passive data source on an identification card; and
   a processor coupled to the scanner, the processor configured to:
   receive a scanner signal from the scanner;
   verify an age of a user based on the scanner signal; and
   transmit a verification signal to an age-restricted device, the verification signal configured to be received by the age restricted device, the age restricted device configured to activate for use based in part on receipt of the verification signal.

2. The system of claim 1, wherein verifying an age of the user comprises:
   determining a type of encryption associated with the passive data source; and
   extracting one or more known data elements from the passive data source.

3. The system of claim 2, wherein extracting one or more known data elements comprises:
   transmitting data associated with the passive data source to a server configured to:
   extract a date of birth from the passive data source; and
   transmit the date of birth to a device associated with the scanner.

4. The system of claim 3, wherein the server is further configured to:
   extract data comprising one or more of: a first name, a last name, an address, a city, a state, a zip code, an issue date, or an expiration date from the passive data source; and
   transmit the extracted data to a device associated with the scanner.

5. The system of claim 3, wherein the server is further configured to determine whether a user is an authorized user.

6. The system of claim 5, wherein determining whether the user is an authorized user comprises determining whether the user has activated another age-restricted device within a predefined time period.

7. The system of claim 1, wherein the age-restricted device is in communication with the processor via a network connection comprising one or more of: Bluetooth, RFID, or NFC.

8. The system of claim 1, wherein the scanner comprises a digital camera on a smartphone and wherein the processor is configured to crop an image of the passive data source.

9. The system of claim 1, wherein the passive data source comprises one or more of: data encoded in a Near Field Communication (NFC) device, a Radio-frequency identification (RFID) chip, a SmartCard, an Integrated Circuit Card (ICC), a magnetic strip, a quick response (QR) code, optical media, or PDF-417.

10. The system of claim 1, wherein the age-restricted device comprises an electronic cigarette.

11. A system for activating an age-restricted device, the system comprising:
   a processor configured to receive a verification signal and activate the age-restricted device based on the age verification signal; and a network interface configured to receive a verification signal from a remote device, wherein the remote device comprises:
  a scanner configured to scan a passive data source on an identification card; and
  a processor coupled to the scanner, the processor configured to:
    receive a scanner signal from the scanner;
    verify an age of a user based on the scanner signal; and
    transmit the verification signal to the age-restricted device, the verification signal configured to be received by the age restricted device, the age restricted device configured to activate for use based in part on receipt of the verification signal.

12. The system of claim 11, wherein verifying an age of the user comprises:
  determining a type of encryption associated with the passive data source; and
  extracting one or more known data elements from the passive data source.

13. The system of claim 12, wherein extracting one or more known data elements comprises:
  transmitting data associated with the passive data source to a server configured to:
    extract a date of birth from the passive data source; and
    transmit the date of birth to a device associated with the scanner.

14. The system of claim 13, wherein the server is further configured to:
  extract data comprising one or more of: a first name, a last name, an address, a city, a state, a zip code, an issue date, or an expiration date from the passive data source; and
  transmit the extracted data to a device associated with the scanner.

15. The system of claim 13, wherein the server is further configured to determine whether a user is an authorized user.

16. The system of claim 15, wherein determining whether the user is an authorized user comprises determining whether the user has activated another age-restricted device within a predefined time period.

17. The system of claim 11, wherein the age-restricted device is in communication with the processor via a network connection comprising one or more of: Bluetooth, RFID, or NFC.

18. The system of claim 11, wherein the scanner comprises a digital camera on a smartphone and wherein the processor is configured to crop an image of the passive data source.

19. The system of claim 11, wherein the passive data source comprises one or more of: data encoded in a Near Field Communication (NFC) device, a Radio-frequency identification (RFID) chip, a SmartCard, an Integrated Circuit Card (ICC), a magnetic strip, a quick response (QR) code, optical media, or PDF-417.

20. The system of claim 11, wherein the age-restricted device comprises an electronic cigarette.

21. A method for activating an age-restricted device, the method comprising:
  receiving a scanner signal from a scanner configured to scan a passive data source on an identification card;
  verifying an age of a user based on the scanner signal; and
  transmitting a verification signal to an age-restricted device, the verification signal configured to be received by the age restricted device, the age restricted device configured to activate for use based in part on receipt of the verification signal.

22. The method of claim 21, wherein verifying an age of the user comprises:
  determining a type of encryption associated with the passive data source; and
  extracting one or more known data elements from the passive data source.

23. The method of claim 22, wherein extracting one or more known data elements comprises:
  transmitting data associated with the passive data source to a server configured to:
    extract a date of birth from the passive data source; and
    transmit the date of birth to a device associated with the scanner.

24. The method of claim 23, wherein the server is further configured to:
  extract data comprising one or more of: a first name, a last name, an address, a city, a state, a zip code, an issue date, or an expiration date from the passive data source; and
  transmit the extracted data to a device associated with the scanner.

25. The method of claim 23, wherein the server is further configured to determine whether a user is an authorized user.

26. The method of claim 25, wherein determining whether the user is an authorized user comprises determining whether the user has activated another age-restricted device within a predefined time period.

27. The method of claim 21, wherein the scanner comprises a digital camera on a smartphone and wherein the method further comprises cropping an image of the passive data source.

28. The method of claim 21, wherein the passive data source comprises one or more of: data encoded in a Near Field Communication (NFC) device, a Radio-frequency identification (RFID) chip, a SmartCard, an Integrated Circuit Card (ICC), a magnetic strip, a quick response (QR) code, optical media, or PDF-417.

29. The method of claim 21, wherein the age-restricted device comprises an electronic cigarette.

30. A method for activating an age-restricted device, the method comprising:
  receiving an age verification signal from a remote device, wherein the remote device comprises:
    a scanner configured to scan a passive data source on an identification card; and
    a processor coupled to the scanner, the processor configured to:
      receive a scanner signal from the scanner;
      verify an age of a user based on the scanner signal;
      transmit the verification signal to the age-restricted device, the verification signal configured to be received by the age restricted device, the age restricted device configured to activate for use based in part on receipt of the verification signal; and
  activating the age-restricted device based on the verification signal.

31. The method of claim 30, wherein verifying an age of the user comprises:
  determining a type of encryption associated with the passive data source; and
  extracting one or more known data elements from the passive data source.

32. The method of claim 31, wherein extracting one or more known data elements comprises:
  transmitting data associated with the passive data source to a server configured to:
    extract a date of birth from the passive data source; and transmit the date of birth to a device associated with the scanner.

33. The method of claim 32, wherein the server is further configured to:
extract data comprising one or more of: a first name, a last name, an address, a city, a state, a zip code, an issue date, or an expiration date from the passive data source; and
transmit the extracted data to a device associated with the scanner.

34. The method of claim 32, wherein the server is further configured to determine whether a user is an authorized user.

35. The method of claim 34, wherein determining whether the user is an authorized user comprises determining whether the user has activated another age-restricted device within a predefined time period.

36. The method of claim 30, wherein the age-restricted device is in communication with the processor via a network connection comprising one or more of: Bluetooth, RFID, or NFC.

37. The method of claim 30, wherein the scanner comprises a digital camera on a smartphone and wherein the processor is configured to crop an image of the passive data source.

38. The method of claim 30, wherein the passive data source comprises one or more of: data encoded in a Near Field Communication (NFC) device, a Radio-frequency identification (RFID) chip, a SmartCard, an Integrated Circuit Card (ICC), a magnetic strip, a quick response (QR) code, optical media, or PDF-417.

39. The method of claim 30, wherein the age-restricted device comprises an electronic cigarette.

* * * * *